United States Patent

[11] 3,572,822

[72] Inventor Alfred Schmid
       Munich-Furstenried, West Germany
[21] Appl. No. 818,943
[22] Filed Apr. 24, 1969
[45] Patented Mar. 30, 1971
[73] Assignee Webasto-Werk, G.m.b.H.
       Munich, Germany
[32] Priority May 16, 1968
[33] Austria
[31] A4701

[54] SLIDABLE VEHICLE ROOF ASSEMBLY
     16 Claims, 4 Drawing Figs.
[52] U.S. Cl. .................................................. 296/137,
                                                              49/210
[51] Int. Cl. ................................................ B60j 7/04
[50] Field of Search .......................................... 296/137;
                                49/155, 156, 209, 210, 361, 362

[56] References Cited
            UNITED STATES PATENTS
2,968,514  1/1961  Golde .......................... 296/137
3,033,608  5/1962  Golde .......................... 296/137
3,055,701  9/1962  Golde et al. .................... 296/137
            FOREIGN PATENTS
884,344   12/1961  Great Britain ................ 296/137
984,159    2/1965  Great Britain ................ 296/137
485,186   10/1953  Italy ............................ 296/137

Primary Examiner—Kenneth H. Betts
Assistant Examiner—Leslie J. Paperner
Attorney—Otto John Munz ABSTRACT: A sliding roof section for vehicles including a panel which is pivotally supported at the front, and supported at the rear by means of a support member which may move, with the roof, both horizontally and vertically so that when the rear of the panel is lowered, the panel may be slid rearwardly under the stationary part of the roof. Additionally, the rear of the panel may be moved upwardly from its normally closed position to provide ventilation.

PATENTED MAR 30 1971 3,572,822
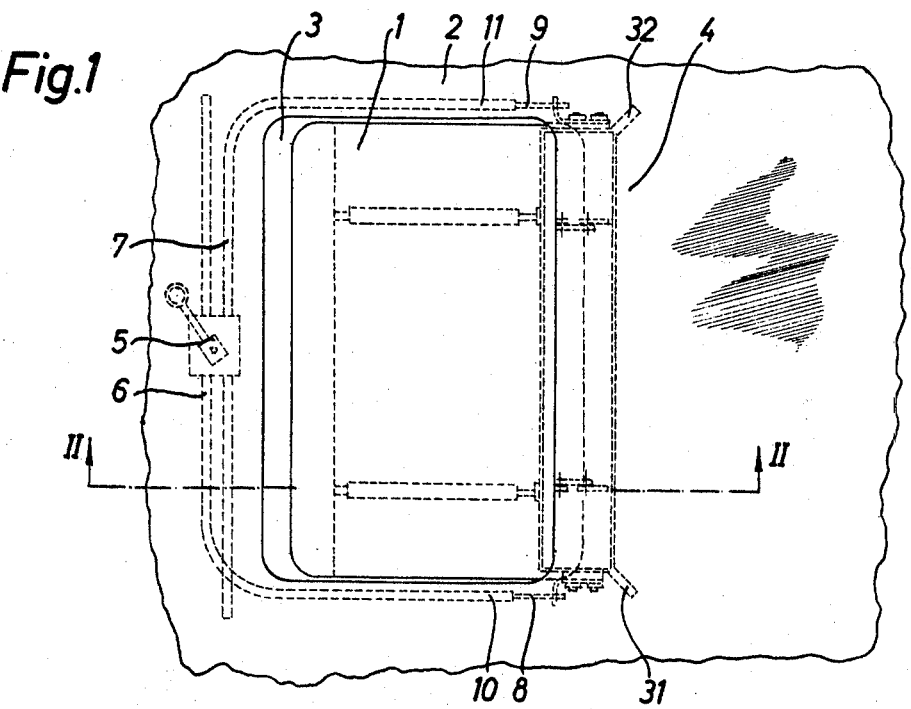
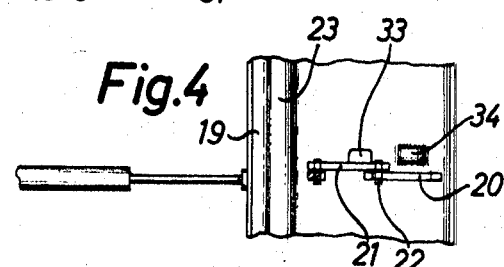
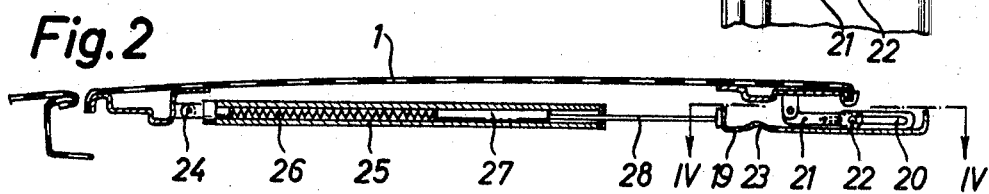
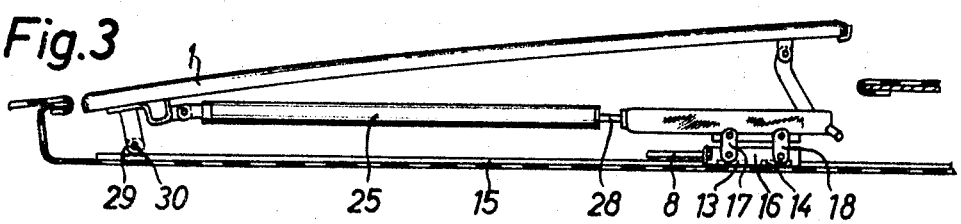
Inventor:
Alfred Schmid
Attorney

SLIDABLE VEHICLE ROOF ASSEMBLY

The invention relates to a sliding roof for vehicles, and more especially to a roof of the kind provided with a panel fitted in an aperture in the roof which can be lowered from the panel at its rear end and moved rearwardly to slide under a stationary part of the roof, during which operation it is carried at each side of its forward end by a guide member running in a guide, each guide member being provided with a pivot about which the panel can be swung upwards out of the plane of the roof, within a limited range.

A slidable roof of the above described kind is disclosed in U.S. Pat. No. 3,033,608, but in addition to a slidable panel, there is incorporated a second roof part, which substantially closes the opening in the roof, and which can be displaced in the longitudinal direction. Although this second part is constructed to be outwardly pivotable relatively easily, it is not only necessary to have a comparatively bulky mechanism, but also the outward pivoting movement can only be effected after the roof has been thrust rearwardly.

In order to obviate this last-named disadvantage, it has been proposed to construct a panel which is disposed in a roof opening and which, after unlocking, can be displaced into a pocket in that part of the reinforcing frame which lies at the front, (within reference to the direction of travel) and to guide the said panel at the sides in such a way that, in the displaced condition, the rear part of the panel is at an acute angle to the plane of the roof, after the fashion of a wind deflector. However, this gives rise, inter alia, to the disadvantages that the roof can only be used for ventilation, and that rapid ventilation by opening the roof, for example after the car has been standing in the sun for a considerable period is not possible.

The object of the present invention is to provide a vehicle roof of the kind initially referred to in such a way that the entire panel may be pivoted outwards in a stable manner, and thus draught-free ventilation of the car, even at high speed of travel, can be achieved without using an additional wind deflector. It is a further object to retain the facility of opening the roof by displacing the panel under a stationary part of the roof.

With this end in view the invention consists in a slidable vehicle-roof comprising a panel displaceably accommodated in an aperture in the roof, and, when lowered at its rear end from said aperture, slidable to a position beneath a fixed part of the roof, wherein adjacent to the rear end of the panel is a supporting or operating component connected to said panel, or movable between an upper position where it lifts the panel into a closed position in said aperture, and a lower position where it is horizontally movable and causes the panel to move with it.

The rear end of the panel may be connected to the cross member by lever members consisting, in each case, of one lever connected between the panel and the crosspiece, each lever being attached to the crosspiece by a pin connected to the end of the lever and arranged in a slotted guide, the latter being disposed in such a way that, during horizontal movement of the crosspiece in raised position, the guide slot first slides along the pin and, by its end, moves the latter from a prearranged position in the direction of the front end of the panel. As a result of this "lost-motion" connection of the crosspiece which initially has no effect on the outward pivoting of the panel adjustment of the drive mechanism is made considerably easier, since for the closed position of the panel, which lies between the position of the panel when swung upwards out of the plane of the roof, and the position when swung down out of the plane of the roof for sliding, there is available not only a quite specific position of the drive, but also a selectable range.

A further advantage of the aforesaid "lost-motion" in the lifting operation lies in the fact, which is particularly necessary in the case of more forceful closure of the roof and thus larger lever members, that it is possible to fasten lifting members on the crosspiece which engage on parts of the levers, when the crosspiece is moved in the raised condition, in such a way as to cause lifting of those ends of the levers which are nearest the panel. As a result of this, the levers, which usually lie very flat and thus having a locking effect, are brought into a more favorable position for the outward pivoting of the panel, i.e. a position where less force is required.

It is advantageous to construct the crosspiece with one or more rain channels and provide it with outlets into the rain gutters at the sides of the vehicle. Thus, even when the car is stationary and the panel is pivoted outwards, no water enters the car.

For satisfactory functioning of the lifting mechanism, there is preferably provided, between the panel and the crosspiece, a spring device which, as viewed from the crosspiece, presses the panel in a forward direction. By this means, outward pivoting of the panel when the lever members are lowered, is prevented. However, the outward pivoting movement can also be prevented by suitable guides which do not release the panel until the crosspiece has passed through the above described range which is ineffective as regards the outward pivoting of the panel. To a preferred construction, the spring device consists of two springs, each of which is located in a tube articulated to the panel, and presses against a piston which is guided in the tube and connected to the crosspiece.

The crosspiece may be guided in known manner by guide shoes in guide rails mounted at the sides of the roof. In this connection it is advantageous if the crosspiece is connected to the guide shoe carriers by at least one, but preferably two links in each case, which are pivoted both to the crosspiece and also to the guide show carrier.

In the following description, one exemplified embodiment of the invention will now be described, with reference to the accompanying drawings and other features of the invention will be mentioned. In the drawings:

FIG. 1 illustrates, in plan view, a slidable roof panel in accordance with the invention in partly open state;

FIG. 2 shows a section along the lines II–II in FIG. 1, on an enlarged scale;

FIG. 3. shows a side view, observed from the rain channel, when the panel is pivoted outwards; and FIG. 4 is a top view along the lines IV–IV of FIG. 2.

Referring to FIG. 1, a panel 1 of a vehicle roof 2 is seated in and closes an aperture 3, from which it can be displaced to slide rearwardly under a stationary part 4 of the roof 2. Drive is effected with the aid of a crank 5 and cables, which are sufficiently stiff to resist compression, and are guided in tubes 6, 7, and by rods or bars 8, 9 which are telescoped and guided in tubes 10, 11.

As seen in FIG. 3, the rod or bar 8 moves a carrier shoe 16 which is guided by lugs 13, 14 in a rail 15 and is articulated to a crosspiece 19 by two links 17, 18.

FIG. 2 shows the mechanism for outward pivoting of the panel 1, comprising a slotted guide 20 upstanding from the crosspiece 19, in which slot is engaged in pin 22 connected to a lever 21 which is pivoted to a lug or bracket beneath the panel 1 near to its rear end. When the crosspiece 19 is moved forwards, the guide slot 20 first slides over the pin 22 as far as the rear stop and then moves the lever 21 about its pivot, causing the panel 1 to rock upwards. By means of a lifting member in the form of a rib or corrugation 23 located adjacent to the guide slot 20, the lever 21 may be raised slightly just before the slot 20 displaces the pin 22, when the crosspiece 19 is moved.

The device is operated as follows:

When the panel is in its closed position (FIG. 2) the crosspiece 19 is held in an upper position by the carrier slides 16, (with their toggle levers in the position shown in FIG. 3), but the lever 21 is in substantially horizontal position (FIG. 2) so that the panel occupies its aperture. To displace the panel in order to open the aperture the carriers 16 are moved rearwardly by the rods 8, 9 actuated by the crank 5, and the initial result is that the toggle levers swing down about their pivots 13, 14 to substantially horizontal positions, lowering the crossmember 19, and with it also lowering the rear end of the panel 1 beneath the adjacent fixed roof edge. Upon further rearward movement, the carriers 16 draw after them the crossmember 19 which draws the lowered panel 1 beneath the fixed roof. Return movement of the carriers 16 recloses the panel in its aperture by the same sequence of operations in reverse.

When in its closed position FIG. 2 the panel 1 can be tilted to its raised position (FIG. 3) by actuating the rods 8, 9 to move the carriers 16, and with them the crossmembers 19, forwardly (i.e. leftwards as seen in FIG. 2) until the slot 20 elevates the lever 21 (FIG. 3) as described above.

A spring device, consisting of a tube 25 pivotally attached to a bracket at 24, housing a spring 26 and a piston 27, (and which, as shown in FIG. 1, may be in duplicate, one adjacent to each side of the panel), prevents not only premature outward pivoting of the panel 1, but also premature lowering of the crosspiece 19, when the latter, in the position shown in FIG. 3, is moved rearwards by the guide carrier 16. In this movement, the crosspiece 19 would be lowered by the links 17, 18, if there were no followup thrust by the spring device 25—27 applied to the crosspiece 19 by a bar 28. Only after lowering of the panel 1, (that is to say when the pin 22 in the slot guide 20 is located at the forward end of the slot 20, and the spring device 25—27 cannot push the crosspiece back any further), can there occur, (as a result of the further movement of the carrier 16 due to the pivoting of the links 17, 18,) a lowering of the crosspiece 19 and thus at the same time a lowering of the panel 1, (which may subsequently be drawn by the crosspiece 19 to a position under the stationary part 4 of the roof. During the reverse movement, the raising of the crosspiece may be prevented, before the closed position of the panel 1 is reached, in known manner, such as, by means of a guide (not shown) which does not release the crosspiece 19 until the panel 1 is in the closed position.

As seen in FIG. 3, the front guide member, which is here shown as a sliding carrier 29, and slides in the rail 15, is attached to the panel 1 on a pivot axis 30 about which the panel 1 can be swung upwards out of the plane of the roof, within a limited range.

As seen in FIG. 2, the crosspiece may be formed with rain channels, having outlets leading to the lateral rain gutters, indicated by 31 and 32 in FIG. 1, conventional in a vehicle roof.

The invention is not limited solely to the constructional details illustrated, but may be modified and supplemented in various ways without departing from the scope of the invention as defined in the appended claims.

I claim:

1. A movable section for a vehicle roof including:
   a. a panel lying in the plane of said roof in a first position;
   b. support means near the front of said panel to which said panel is pivotally attached;
   c. said support means being carried by a guide member;
   d. means movable both horizontally and vertically for supporting the rear of said panel;
   e. means for moving said rear support means vertically;
   f. means for moving said rear support means horizontally;
   g. whereby said rear support means and said panel may be lowered out of the plane of said roof and moved rearwardly under the stationary portion of said roof to a second position;
   h. said means for moving said rear support means vertically including a lost-motion linkage; and
   i. whereby moving said rear support means horizontally forward moves the rear of said panel from the closed position upwardly out of the plane of said roof.

2. A movable section for a vehicle roof as in claim 1 and including a spring means between said panel and said rear support means for biasing said panel in a forward direction.

3. A movable section for a vehicle roof as in claim 1 and wherein; said lost-motion linkage includes a pin-in-slot connection.

4. A movable section for a vehicle roof as in claim 3 and wherein; said rear support means includes a crosspiece laterally disposed of said roof.

5. A movable section for a vehicle roof as in claim 4 and including; spring means between said panel and said rear support means for biasing said panel in a forward direction.

6. A movable section for a vehicle roof as in claim 5 and wherein said spring means includes:
   a. a cylinder attached at one end to said panel;
   b. a piston in said cylinder and having a piston rod attached to said rear support means; and
   c. a spring between the face of said piston and the end of said cylinder.

7. A movable section for a vehicle roof as in claim 5 and including; a rain gutter formed in said rear support means and having an outlet into a lateral rain gutter of the vehicle.

8. A movable section for a vehicle roof as in claim 7 and including; rails for guiding the horizontal movement of said rear support means.

9. A movable section for a vehicle roof including:
   a. a panel lying in the plane of said roof in a first position and able to be lowered at its rear out of said plane and moved rearwardly under a stationary portion of said roof to a second position;
   b. first support means being pivotally attached to the front end portion of said panel for allowing a limited pivotal displacement of the front end portion upwards about a pivot-axis provided by said support means, out of the plane of the roof to a third position;
   c. said first support means being carried by a guiding member;
   d. a crosspiece located beneath the rear portion of the panel and horizontally movable on guides that are laterally disposed of said roof;
   e. means for moving said crosspiece horizontally; and
   f. second support means movable both horizontally and vertically for pivoting the rear of said panel in said third position by moving said crosspiece horizontally in relation to the panel, when the panel is in said first position.

10. A movable section for a vehicle roof as set forth in claim 9 and wherein:
    a. said means for moving said crosspiece vertically include a lost-motion linkage; and
    b. whereby moving said crosspiece horizontally forward moves the rear of said panel from the closed position upwardly out of the plane of said roof.

11. A movable section for a vehicle roof as in claim 10 including spring means between said panel and said crosspiece for biasing said panel in a forward direction.

12. A movable section for a vehicle roof as in claim 10 and wherein; said lost motion linkage include a pin-in-slot connection.

13. A movable section for a vehicle roof as in claim 12 and including a spring means between said panel and said crosspiece for biasing said panel in a forward direction.

14. A movable section for a vehicle roof as in claim 13 and wherein said spring means include:
    a. a cylinder attached at one end to said panel;
    b. a piston in said cylinder and having a piston rod attached to said crosspiece; and
    c. a spring between the face of said piston and the end of said cylinder.

15. A movable section for a vehicle roof as in claim 13 and including a rain gutter formed in said crosspiece and having an outlet into a lateral rain gutter of the vehicle.

16. A movable section for a vehicle roof as in claim 15 and including rails for guiding the horizontal movement of said crosspiece.